United States Patent [19]

Maurer

[11] 4,205,535
[45] Jun. 3, 1980

[54] HOUSEHOLD SOFT-ICE-CREAM MACHINE

[75] Inventor: Wilhelm Maurer, Zurich, Switzerland

[73] Assignee: M & F Engineering AG, Zurich, Switzerland

[21] Appl. No.: 939,219

[22] Filed: Sep. 5, 1978

[30] Foreign Application Priority Data

Sep. 26, 1977 [CH] Switzerland .................. 11715/77

[51] Int. Cl.² .................................................. A23G 9/00
[52] U.S. Cl. ........................................... 62/342; 62/529
[58] Field of Search ............. 62/342, 343, 529, 68–70; 366/309

[56] References Cited

U.S. PATENT DOCUMENTS

| | | | |
|---|---|---|---|
| 1,731,539 | 10/1929 | Pearson | 62/529 X |
| 1,916,746 | 7/1933 | Swisher | 62/69 |
| 2,557,813 | 6/1951 | Burton | 62/342 X |
| 2,812,924 | 11/1957 | Hapman | 366/309 X |
| 3,003,324 | 10/1961 | Vance et al. | 62/529 X |
| 3,057,452 | 10/1962 | Griffin | 62/529 X |
| 3,780,536 | 12/1973 | Fishman et al. | 62/342 |
| 3,797,263 | 3/1974 | Garavelli | 62/342 X |
| 3,889,743 | 6/1975 | Presnick | 62/529 X |

Primary Examiner—Albert J. Makay
Assistant Examiner—William E. Tapolcai, Jr.
Attorney, Agent, or Firm—Ostrolenk, Faber, Gerb & Soffen

[57] ABSTRACT

A household soft-ice-cream machine is disclosed. The soft-ice-cream machine includes a housing with a removable lid, said housing including a hollow chamber in which soft ice cream may be formed. An agitator for agitating a soft ice cream mix is located in the hollow chamber. A replaceable cooling cartridge is located in the housing below the hollow compartment and cools the compartment. A replaceable pressure gas cartridge is attached to the housing and introduces pressurized gas into the hollow chamber. A soft ice cream removal valve permits removal of the soft ice cream from the hollow compartment.

15 Claims, 1 Drawing Figure

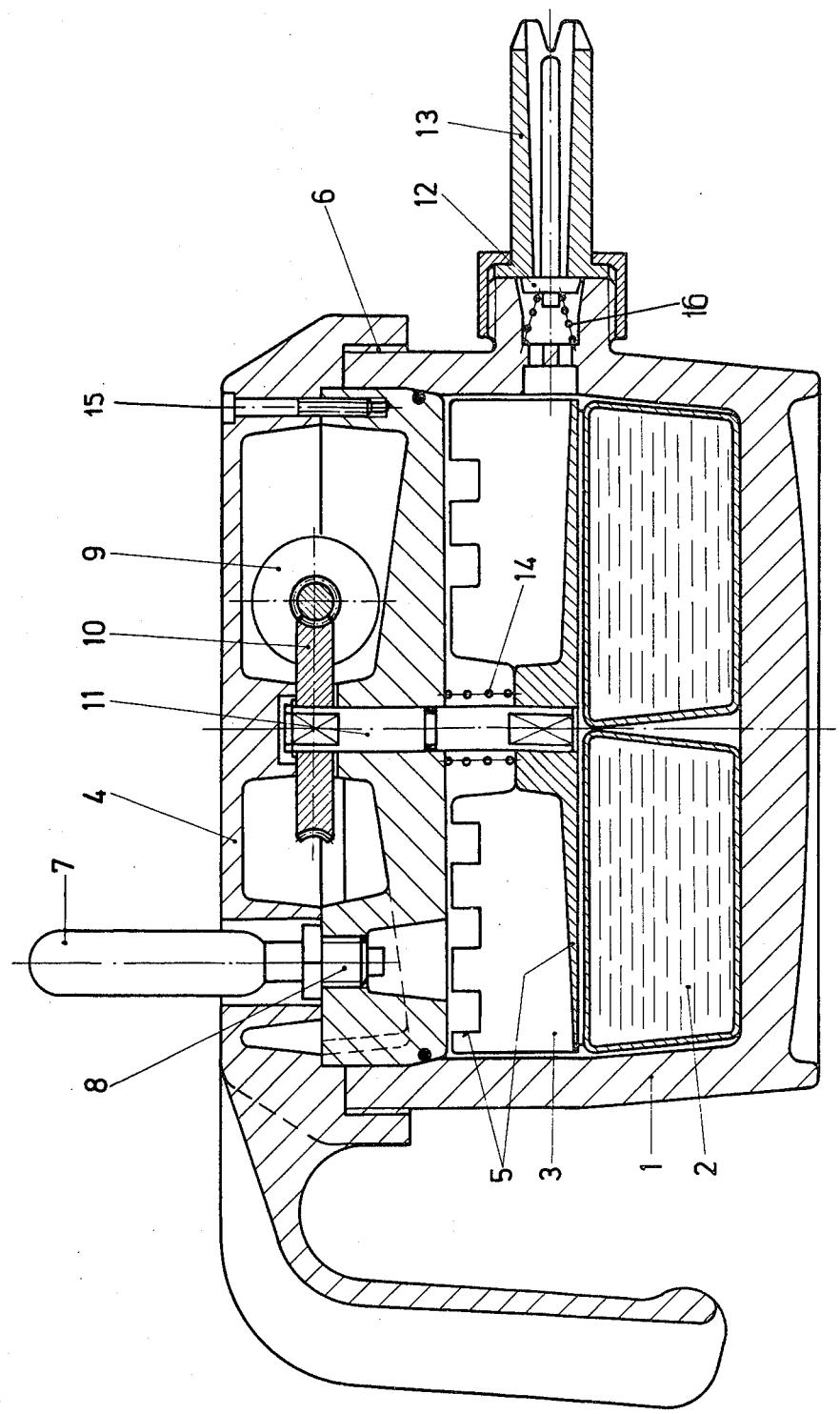

HOUSEHOLD SOFT-ICE-CREAM MACHINE

BACKGROUND OF THE INVENTION

While household soft-ice-cream machines have been available to the public for many years, they have not gained wide acceptance. The known machines have a large number of moving parts making them both relatively expensive and difficult to keep clean. Since they are difficult to clean, they have not met standard hygenic requirements.

The known household soft-ice-cream machines operate with cooling cartridges in the form of a hollow cylinder. The manufacture of these cartridges is extremely expensive and substantially increases the price of the machines. Additionally, it is difficult to scrape the soft ice cream off these cylindrical cartridges. The primary parts of the machine, in particular the individual moving parts, are poorly accessible for cleaning. Additionally, several parts are accessible only when the machine is dismantled by an expert making it impossible for the home user to clean these parts.

Soft-ice-cream machines are known in which the gas pressure required is produced by the actuating of a hand pump. This embodiment has proven unsuitable, both from the standpoint of manufacture and with respect to cleaning and uniformity of the gas pressure upon the production of soft ice cream. It has furthermore been found that manual operation of the agitator mecessary for the production of soft ice cream is undesirable and that prior art household soft-ice-cream machines may deliver non-homogeneous soft ice cream as a result of irregularities which occur in the stirring process.

BRIEF SUMMARY OF THE INVENTION

The present invention is therefore based on the desire to create a simple, easily cleaned household soft ice cream machine which has as few rotating parts as possible, is easy to clean and operate and takes up little space. Such a household soft-ice-cream machine in accordance with the present invention comprises:

a housing with a removable lid, said housing including a hollow chamber in which soft ice cream can be made;

a replaceable pressure gas cartridge attached to said housing for introducing pressurized gas into said hollow chamber;

a replaceable cooling cartridge adapted to be received in the bottom of said housing, said cooling cartridge having a flat upper cooling surface on which soft ice cream is formed;

a scraping tool adapted to scrape soft ice cream formed on said cooling surface off of said cooling surface as said tool is moved over said cooling surface;

means for moving said scraping tool over said cooling surface so as to scrape soft ice cream off of said cooling surface said upper cooling surface defining the entire bottom surface of said hollow chamber when said cooling cartridge is placed in the bottom of said housing; and a soft ice cream removal valve for permitting the removal of soft ice cream from said hollow chamber.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

The sole FIGURE is a longitudinal section of a soft-ice-cream machine constructed in accordance with the principles of the present invention.

DETAILED DESCRIPTION OF THE PREFERRED EMBODIMENT

Referring now to the drawing, the soft ice cream machine includes a housing 1, preferably made of plastic, the inside of which is of rotational symmetry and tapers conically slightly down towards the bottom. In the lower part of the housing 1 there is a cooling cartridge 2 which is developed in the form of a thick disk and has a conical taper both on the inside and on the outside. The outer taper conforms to the shape of the side of the housing 1. The inner taper is formed in a manner which makes it possible to easily lift the cooling cartridge 2, which is preferably divided in its meridian plane, out of the housing 1. This is desirable since it makes it possible to cool in freezer compartments of limited size. Above the cooling cartridge 2 is a hollow space 3, into which a liquid soft ice cream mix is introduced. This space is closed by a lid 4 having a lock 6, for instance a twist closure such as that used in pressure cookers. The hollow space 3 is traversed by a scraping and agitating tool 5 which rotates about a shaft 11. The agitating tool 5 is driven by a motor 9, via a worm gearing 10, by means of shaft 11. All of these parts are arranged in the lid 4. As shown in the figure, they are easily accessible since the shaft 11 can be pulled out of the worm gearing 10. An O-ring ensures that no soft ice cream rises up out of the hollow space 3 through the borehole (receiving shaft 11) in the lid 4. The lid 4 is made in two parts and can be taken apart simply by loosening screws 15 and made accessible for overhaul.

A pressure cartridge 7 is screwed into lid 4 and supplies the pressure gas necessary for the production of soft ice cream. A non-return valve 8 is located at the outlet of the pressure cartridge 7.

A removal valve 12 is located on the side of housing 1 and is surrounded by an elastic sleeve 13. The valve 12 is loaded by a coil spring 16 and can be easily and rapidly removed by loosening a cap nut. In order to produce a constant pressure of the agitating tool 5 against the upper top surface of the cooling cartridge 2, a compression spring 14 is provided. One end of spring 14 rests against the hub of the agitator 5, which can be removed from the shaft 11, and the other end rests against the inner surface of the lid 4 facing the hollow space 3.

Soft ice cream is prepared in the following manner. A cooling cartridge 2, which has been cooled in a refrigerator, is inserted into the housing 1. Thereafter a predetermined quantity of liquid soft-ice-cream mix is poured into the hollow space 3 of the housing 1. The lid 4, bearing the scraping and agitating tool 5, is then screwed onto the housing 1 or connected with the housing 1 via the lock 6. A gas of predetermined pressure is introduced into the hollow space 3 by means of the pressure cartridge 7, similar to that used for a cream whipper or siphon. The motor 9 is now placed in operation and drives the scraping and agitating tool 5. The tool 5, due to the compression spring 14, is forced against the upper top surface of the cooling cartridge 2 with a predetermined force and uniformly scrapes the soft ice cream off from the top surface of the cartridge 2 as it is formed. When, after a given period of time, the correct consistency of the frozen material has been reached, it can be removed through the valve 12. Lateral pressure on the rubber sleeve 13 opens the valve 12 by canting the valve body, so that the soft ice cream flows out of the valve 12 under the pressure which prevails in the chamber 3. In principle it is also possible to hold the lid 4 secure on the housing 1 by means of a yoke which is swingably attached to the housing, whereby the closing of the machine is made even easier.

The machine described is extremely simple in construction and therefore relatively cheap. It has only these rotating parts which are absolutely necessary and is furthermore provided with extremely simple individual parts which are easily accessible for cleaning.

In summary, a soft-ice-cream machine for the home must be of simple construction so that it can be cleaned in a simple reliable manner since soft ice cream compositions form an excellent culture medium for bacteria. The household soft-ice-cream machine described can be easily taken apart and is provided with extremely simple individual parts, a cooling cartridge being formed with a flat top surface which permits uniform and complete scraping of the soft ice cream formed thereon. The gas pressure within the machine is produced by means of an ordinary commercial pressure-gas cartridge, while the driving of the agitator is effected by an electric motor, which may be fed by battery or a standard a.c. source. The removal valve, which also has no rotating parts, is extremely simple to operate so that it can be opened and closed by moving the machine as a whole.

The present invention may be embodied in other specific forms without departing from the spirit or essential attributes thereof and, accordingly, reference should be made to the appended claims, rather than to the foregoing specification as indicating the scope of the invention.

What is claimed is:

1. A household soft-ice-cream machine, comprising:
   a housing with a removable lid, said housing including a hollow chamber in which soft ice cream can be made;
   a replaceable pressure gas cartridge attached to said housing for introducing pressurized gas into said hollow chamber;
   a replaceable cooling cartridge adapted to be received in the bottom of said housing, said cooling cartridge having a flat upper cooling surface on which soft ice cream is formed, said upper cooling surface defining the entire bottom surface of said hollow chamber when said cooling cartridge is placed in the bottom of said housing;
   a scraping tool adapted to scrape soft ice cream formed on said cooling surface off of said cooling surface as said tool is moved over said cooling surface;
   means for moving said scraping tool over said cooling surface so as to scrape soft ice cream off of said cooling surface; and
   a soft ice cream removal valve for permitting the removal of soft ice cream from said hollow chamber.

2. The soft-ice-cream machine of claim 1, wherein said housing is generally cylindrical in shape and wherein said cooling cartridge is disk shaped.

3. The soft-ice-cream machine of claim 2, wherein said cooling cartridge is divided into more than one section.

4. The soft-ice-cream machine of claim 2 or 3, wherein said cooling cartridge has a conical outer wall.

5. The soft-ice-cream machine of claim 4, wherein said cooling cartridge has a conical inner wall.

6. The soft-ice-cream machine of claim 1, wherein said moving means includes a motor and gearing located in said lid.

7. The soft-ice-cream machine of claim 1, wherein said scraping tool also includes means for agitating a soft ice cream mix which may be placed in said hollow chamber.

8. The soft-ice-cream machine of claim 1 or 7, wherein said scraping tool is attached to a drive shaft extending from said lid and wherein said soft-ice-cream machine further includes means for spring biasing said scraping tool against said cooling surface of said cooling cartridge.

9. The soft-ice-cream machine of claim 8, wherein said biasing means biases said scraping tool against said upper surface of said cooling cartridge with a predetermined force.

10. The soft-ice-cream machine of claim 1, wherein said gas cartridge is removably attached to said lid.

11. The soft-ice-cream machine of claim 1, wherein said lid includes a handle.

12. The soft-ice-cream machine of claim 11, wherein said handle extends from one side of said housing and said removal valve extends from the opposite side of said housing.

13. The soft-ice-cream machine of claim 1 or claim 12, wherein said removal valve is a manually controlled valve.

14. The soft-ice-cream machine of claim 1, wherein said removal valve permits soft ice cream to escape from said hollow compartment under the force of said pressurized gas released into said hollow compartment by said pressure gas cartridge.

15. The soft-ice-cream machine of claim 13, wherein said removal valve permits soft ice cream to escape from said hollow compartment under the force of said pressurized gas released into said hollow compartment by said pressure gas cartridge.

* * * * *